United States Patent [19]

Takikawa

[11] Patent Number: 4,577,521
[45] Date of Patent: Mar. 25, 1986

[54] CARRIAGE DRIVE UNIT
[75] Inventor: Makito Takikawa, Furukawa, Japan
[73] Assignee: Alps Electric Co., Ltd., Japan
[21] Appl. No.: 620,014
[22] Filed: Jun. 13, 1984
[30] Foreign Application Priority Data
 Jun. 13, 1983 [JP] Japan .............................. 58-89075[U]
[51] Int. Cl.⁴ ........................................... F16H 21/44
[52] U.S. Cl. ..................................... 74/89.2; 360/106
[58] Field of Search .................. 74/89.2, 89.21, 89.22; 360/106

[56] References Cited
U.S. PATENT DOCUMENTS

| | | | |
|---|---|---|---|
| 2,947,185 | 8/1960 | Ziegler | 74/89.2 |
| 3,373,619 | 3/1968 | Tate et al. | 74/89.2 |
| 3,576,136 | 4/1971 | Myers | 74/89.2 |
| 3,695,215 | 10/1972 | Lambiris | 74/89.2 |
| 4,366,722 | 1/1983 | Hasler | 74/108 |
| 4,419,707 | 12/1983 | Woodier | 74/108 |

Primary Examiner—Lawrence J. Staab
Attorney, Agent, or Firm—Guy W. Shoup

[57] ABSTRACT

A carriage drive unit comprises a carriage, guide means for guiding the carriage, a drive motor having a rotatable shaft, a pulley fixed to the rotatable shaft of the drive motor, a drive belt having a looped portion extending around a peripheral surface of the pulley and having a portion fastened to the carriage for moving the carriage along the guide means in response to rotation of the pulley, and a resilient member disposed between the peripheral surface of the pulley and the drive belt for normally urging the looped portion of the drive belt radially outwardly, the resilient member being elastically deformable under pressure toward the peripheral surface of the pulley.

7 Claims, 5 Drawing Figures

CARRIAGE DRIVE UNIT

BACKGROUND OF THE INVENTION

1. Field of the invention

The present invention relates to a carriage drive unit for driving a carriage supporting a magnetic head, and more particularly to a drive belt attachment construction in such a carriage drive unit.

2. Description of the Prior Art

FIG. 1 of the accompanying drawings illustrates a conventional carriage drive unit composed of a substantially rectangular carriage 1 supporting a magnetic head 2 and slidably mounted on a straight guide shaft 3. A pulley 5 is disposed near the carriage 1 and fitted over a rotatable shaft 4 of a drive motor (not shown) with a drive belt 6 in the form of a thin metal web being looped around the pulley 5. The drive belt 6 has opposite ends fastened by screws 7, 8 to opposite ends of a side wall of the carriage 1, and a central portion fixed by a screw 9 to a peripheral wall of the pulley 5.

Rotative power from the drive motor is transmitted through the pulley 5 to the drive belt 6, which is progressively coiled around the pulley 5 to cause the carriage 1 to slide along the guide shaft 3 for moving the magnetic head 2 to a desired position.

With the prior carriage drive unit thus constructed, the drive belt 6 is fixed under a certain tension to the carriage 1 at the time of assembly in order to eliminate unwanted slippage of the drive belt 6 on the peripheral surface of the pulley 5 and to keep the rotational angle of the pulley 5 and the distance the magnetic head 2 is moved in a constant relationship.

However, it is tedious and time-consuming to fasten the ends of the drive belt 6 to the carriage 1 while tensioning drive belt 6. It is also difficult to assemble the drive belt in order that the drive belt 6 is under optimum tension. Accordingly, the prior art has experienced difficulty in providing a carriage drive unit having a high accuracy of moving a carriage.

SUMMARY OF THE INVENTION

With the prior drawbacks in view, it is an object of the present invention to provide a carriage drive unit for moving a carriage with a high degree of accuracy.

According to the present invention, a carriage drive unit comprises a carriage, guide means for guiding the carriage, a drive motor having a rotatable shaft, a pulley fixed to the rotatable shaft of the drive motor, a drive belt having a looped portion extending around a peripheral surface of the pulley and having a portion fastened to the carriage for moving the carriage along the guide means in response to rotation of the pulley, and a resilient member disposed between the peripheral surface of the pulley and the drive belt for normally urging the looped portion of the drive belt radially outwardly, the resilient member being elastically deformable under pressure toward the peripheral surface of the pulley.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
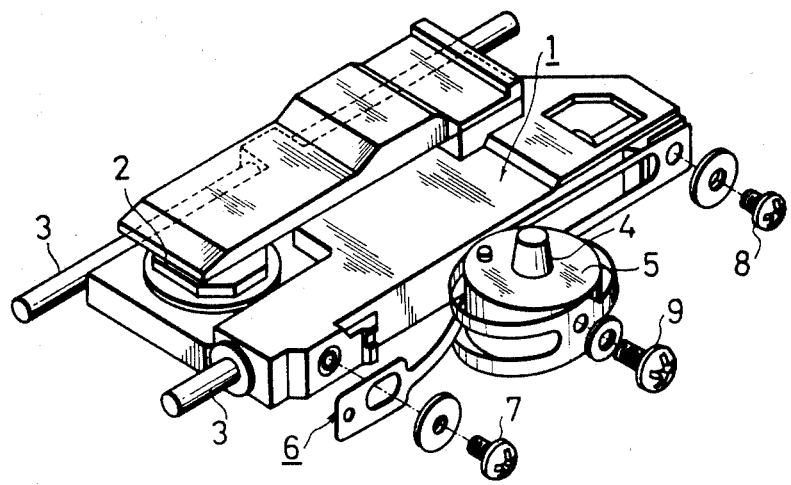
FIG. 1 is a perspective view of a conventional carriage drive unit.
Figure 2:
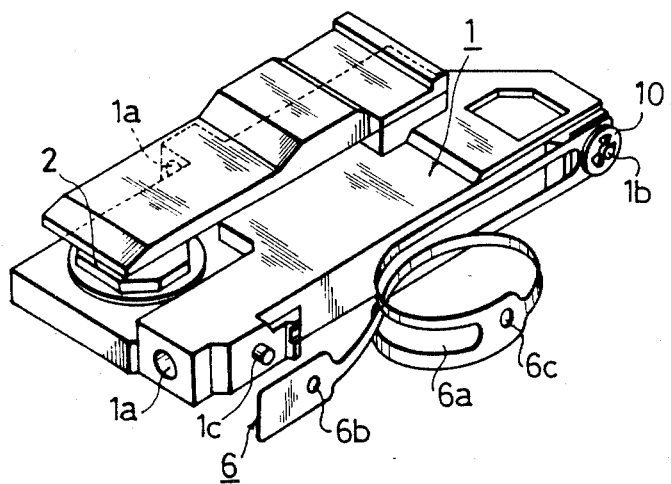
FIG. 2 is a perspective view of a carriage drive unit according to the present invention, showing an assembling step with one end of a drive belt fixed to a carriage.

FIG. 2 shows a carriage 1 and a drive belt 6 in perspective. A pair of magnetic heads 2 (only a lower magnetic head shown) is mounted on the carriage 1. The carriage 1 has longitudinal through holes 1a defined in opposite sides thereof, and a pair of pins 1b, 1c projecting from one side at opposite ends thereof. The drive belt 6 is in the form of a thin metal web having a longitudinal slot 6a, a pair of holes (one shown) 6b in opposite ends, and a hole 6c in a central portion thereof. The drive belt 6 is fixed to the carriage 1 by inserting the right hand pin 1b into the righthand hole (not shown) in the drive belt 6 and forcibly fitting a washer 10 over the pin 1b.

Figure 3:
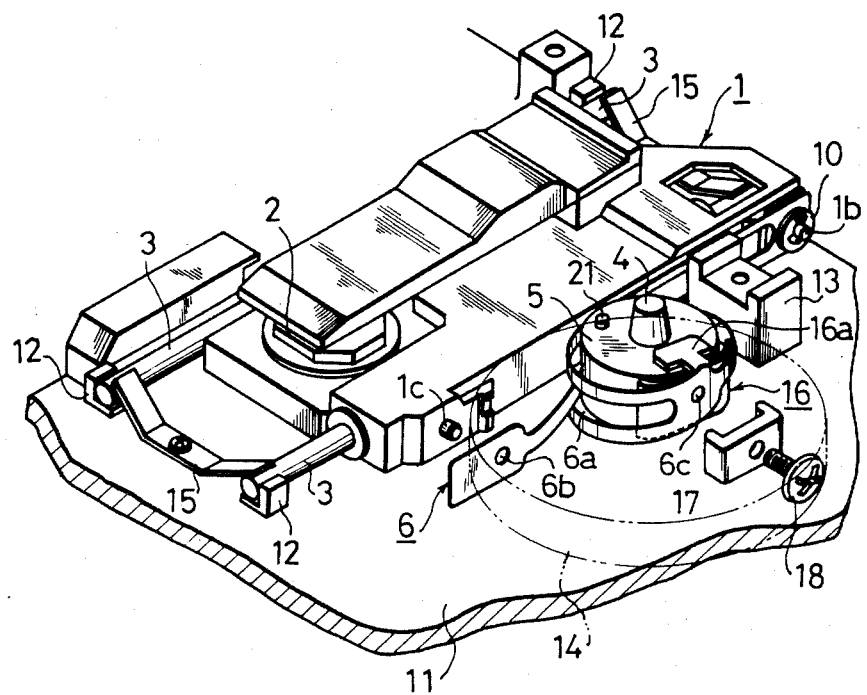
FIG. 3 is a perspective view of the carriage drive unit of the present invention, showing an assembling step with the carriage attached to a chassis.

The carriage 1 shown in FIG. 2 is attached to a chassis 11 as illustrated in FIG. 3. The chassis 11 has two pairs of shaft supports 12, and a stop support 13 on a surface thereof. A drive motor 14 is mounted on the reverse side of the chassis 11 and has a rotatable shaft 4 projecting through the chassis 11. A pulley 5 is fitted over and fixed to the rotatable shaft 4.

A pair of guide shafts 3 extends respectively through the holes 1a in the carriage 1. The guide shafts 3 are disposed on and between the shaft supports 12 and attached to the chassis 11 by leaf springs 15 held resiliently against the guide shafts 3. The other end of the drive shaft 6 (one end already fastened to the carriage 1 by the washer 10) is looped around the peripheral surface of the pulley 5 and extends through the slot 6a away from the fastened end of the drive belt 6. At this time, a resilient member 16 is disposed between the peripheral surface of the pulley 5 and the drive belt 6. The resilient member 16 comprises a metal spring including a flat portion having opposite curved sides of a much smaller curvature than that of the pulley 5. The resilient member 16 also includes an upper bent tongue 16a engaging an upper surface of the pulley 5. Since the drive belt 6 cannot be wound tightly around the pulley 5 due to the resilient member 16, it is not possible at this time to insert the lefthand pin 1c on the carriage 1 into the hole 6b in the free end of the drive belt 6.

Figure 4:
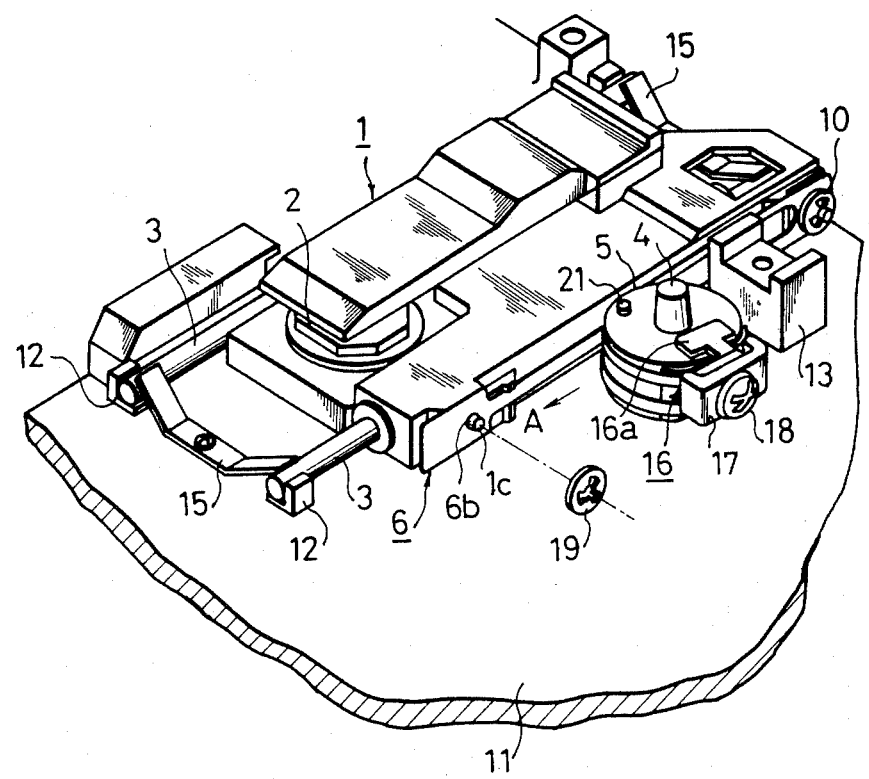
FIG. 4 is a perspective view of the carriage drive unit of the present invention, showing an assembling step with the other end of the drive unit fixed to the carriage.
Figure 5:
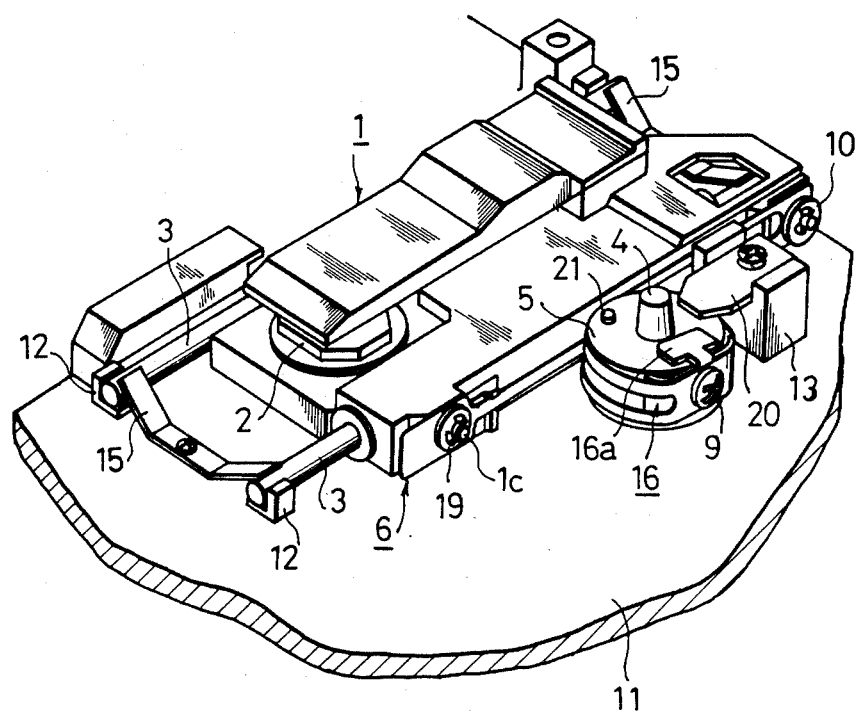
FIG. 5 is a perspective view of the carriage drive unit as assembled.

Then, as shown in FIG. 4, a channel-shaped attachment 17 is fixed by a screw 18 to the pulley 5 with the drive belt 6 interposed. By tightening the screw 18, the attachment 17 is forced toward the peripheral surface of the pulley 5, and thus the curved ends of the resilient member 16 are pressed by the attachment 17 against the peripheral surface of the pulley 5. The drive belt 6 is also displaced toward the peripheral surface of the pulley 5. Since the drive belt 6 can now be pulled in the direction of the arrow A as shown in FIG. 4, the pin 1c on the carriage 1 can easily be inserted into the hole 6b in the free end of the drive belt 6.

After the pin 1c has been inserted in the hole 6b, a washer 19 is force-fitted over the pin 1c. The ends of the drive belt 6 are now secured to the carriage 1. At this time, the drive belt 6 is in a loosened condition, and hence the screw 18 is loosened to remove the attachment 17 to release the resilient member 16. The resilient member 16 now tends to return to its original shape under its own resiliency, urging the coiled portion of the drive belt 6 radially outwardly to thereby impose tenstion on the drive belt 6. Finally, a screw 9 is threaded into the peripheral surface of the pulley 5 to fasten the drive belt 6 and the resilient member 16 to the pulley 5, and a stop plate 20 is screwed to the stop support 13. The stop plate 20 is engageable with a stop 21 projecting from the upper surface of the pulley 5. The rotational angle of the pulley 5, that is, the range of travel of the carriage 1, is limited by engagement between the stop 21 and the stop plate 20.

In the foregoing embodiment, the drive belt 6 is fixed to the carriage 1 by force-fitting the washers 10, 19 over the pins 1b, 1c. However, other means such as screws for fixing the drive belt 6 to the carriage 1 may be employed. The resilient member 16 is not limited to the illustrated configuration.

With the arrangement of the present invention, the drive belt can be looped around the pulley under optimum tension, so that the rotational angle of the pulley and the travel distance of the carriage will be maintained in a constant relationship at all times for improved carriage moving accuracy. In assembly, the drive belt is fixed to the carriage while the resilient member is elastically deformed under pressure toward the peripheral surface of the pulley, and then the resilient member is released, whereupon the drive belt is automatically subjected to tension. Accordingly, the assembling procedure is rendered quite simple.

Although a certain preferred embodiment has been shown and described, it should be understood that many changes and modifications may be made therein without departing from the scope of the appended claims.

What is claimed is:

1. A carriage drive unit comprising:
(a) a carriage;
(b) guide means for guiding said carriage;
(c) a drive motor having a rotatable shaft;
(d) a pulley fixed to said rotatable shaft of said drive motor;
(e) a drive belt having a looped portion extending around and fixed by a screw on a peripheral surface of said pulley and having end portions fastened to said carriage for moving said carriage along said guide means in response to rotation of said pulley; and
(f) a resilient member disposed between said peripheral surface of the pulley and said drive belt for normally urging said looped portion of the drive belt radially outwardly, said resilient member being elastically deformable under pressure, of said screw toward said peripheral surface of the pulley.

2. A carriage drive unit according to claim 1, wherein said resilient member has opposite curved ends held in engagement with said peripheral surface of the pulley and having a smaller curvature than that of said peripheral surface.

3. A carriage drive unit according to claim 2, wherein said resilient member includes a flat portion extending between said opposite curved ends, including a screw threaded through said looped portion of the drive belt and said resilient member into said peripheral surface of the pulley.

4. A carriage drive unit according to claim 3, wherein said resilient member further includes a bent tongue extending from said flat portion and held in engagement with an end surface of said pulley.

5. A method for fastening and tensioning a drive belt looped around a peripheral surface of and fixed to a fastening point on a drive pulley, both ends of which are to be connected to the ends of a carriage to be driven by rotation of the pulley, comprising the steps of providing a resilient member disposed between the peripheral surface of the pulley and the fastening point on the drive belt for normally urging the looped portion of the drive belt radially outward, clamping the resilient member under pressure against the surface of the drive pulley so that the ends of the belt can be extended and secured to the ends of the carriage, and then partially releasing the pressure on the resilient member such that it expands the looped portion and provides a desired tension in the drive belt between the ends thereof.

6. The method of claim 5 wherein said clamping and partially releasing steps are obtained by threading and unthreading a screw through the fastening point of the drive belt in the surface of the pulley.

7. A carriage drive unit assembled in accordance with the method of claim 5.

* * * * *